US012242323B2

(12) United States Patent
Deng et al.

(10) Patent No.: US 12,242,323 B2
(45) Date of Patent: Mar. 4, 2025

(54) HIERARCHICAL MANAGEMENT METHOD FOR TERMINAL DEVICE AND HIERARCHICAL MANAGEMENT SYSTEM FOR TERMINAL DEVICE

(71) Applicant: ZTE CORPORATION, Guangdong (CN)

(72) Inventors: Qingtian Deng, Guangdong (CN); Jun Tian, Guangdong (CN); Weiwei Ma, Guangdong (CN); Jianchang Zhang, Guangdong (CN)

(73) Assignee: ZTE CORPORATION, Guangdong (CN)

( * ) Notice: Subject to any disclaimer, the term of this patent is extended or adjusted under 35 U.S.C. 154(b) by 0 days.

(21) Appl. No.: 18/027,120

(22) PCT Filed: Oct. 18, 2021

(86) PCT No.: PCT/CN2021/124474
§ 371 (c)(1),
(2) Date: Mar. 20, 2023

(87) PCT Pub. No.: WO2022/100374
PCT Pub. Date: May 19, 2022

(65) Prior Publication Data
US 2023/0333626 A1    Oct. 19, 2023

(30) Foreign Application Priority Data
Nov. 10, 2020   (CN) .................. 202011245850.X

(51) Int. Cl.
*G06F 1/3234* (2019.01)
*G05B 19/042* (2006.01)

(52) U.S. Cl.
CPC ......... *G06F 1/3243* (2013.01); *G05B 19/042* (2013.01); *G05B 2219/25289* (2013.01)

(58) Field of Classification Search
CPC .... G06F 1/3243; G06F 1/3203; G06F 1/3234; G06F 1/3206; G06F 1/3209; G05B 2219/25289; G05B 2219/25257
See application file for complete search history.

(56) References Cited

U.S. PATENT DOCUMENTS

2007/0140199 A1*   6/2007  Zhao ................. H04W 52/287
                                                          370/338
2014/0359326 A1   12/2014  Tsao
(Continued)

FOREIGN PATENT DOCUMENTS

| CN | 103279432 A | 9/2013 |
| CN | 109324829 A | 2/2019 |
| CN | 109983513 A | 7/2019 |

OTHER PUBLICATIONS

International search report of PCT Patent Application No. PCT/CN2021/124474 issued on Dec. 28, 2021.
(Continued)

*Primary Examiner* — Raymond N Phan
(74) *Attorney, Agent, or Firm* — HAUPTMAN HAM, LLP

(57) ABSTRACT

Disclosed is a hierarchical management method and system for a terminal device. The terminal device comprises at least one control system, and at least one peripheral apparatus, which is connected to the control system. In the method, when a terminal device receives a wake-up signal during dormancy, a control system corresponding to the wake-up signal is woken up, and the control system in a wake-up state grades an operation mode of the control system according to a data load; and according to the operation mode, a peripheral apparatus that needs to perform data processing is woken up.

8 Claims, 4 Drawing Sheets

(56) References Cited

U.S. PATENT DOCUMENTS

| | | | |
|---|---|---|---|
| 2015/0067211 A1* | 3/2015 | Inooka | G06F 13/364 |
| | | | 710/110 |
| 2019/0215771 A1 | 7/2019 | Kim et al. | |
| 2020/0301497 A1* | 9/2020 | Li | G07C 9/00174 |

OTHER PUBLICATIONS

Extended Search Report in Corresponding European Application No. 21890901.8, dated Sep. 12, 2024; 7 pgs.
First Office Action issued in Indian Patent Application No. 202317018713, mailed Nov. 8, 2024; 7 pgs.

\* cited by examiner

HIERARCHICAL MANAGEMENT METHOD FOR TERMINAL DEVICE AND HIERARCHICAL MANAGEMENT SYSTEM FOR TERMINAL DEVICE

CROSS-REFERENCE TO RELATED APPLICATIONS

The present application claims the priority of Chinese patent application No. 202011245850.X, filed on Nov. 10, 2020 and entitled "Hierarchical management method and system for terminal device", which is incorporated herein by reference in its entirety.

TECHNICAL FIELD

The present disclosure relates to, but are not limited to the technical field of management of terminal power supplies, and in particular relate, but are not limited to a hierarchical management method and system for a terminal device.

BACKGROUND

With the development of electronic technology, various types of terminals and electronic devices are widespreadly used, and the performance, power consumption and standby capability of the electronic devices are continuously upgraded all along as electronic products being upgraded. Especially for some electronic devices that have higher requirements for the standby capability, the contradiction between the performance and the power consumption of each of the electronic devices becomes increasingly prominent, and it is impossible to achieve the aim of prolonging a standby time simply by increasing a battery capacity.

In the related technique, a power supply of an electronic device is managed by using a universal self-registration mechanism, where a main controller is directly woken up, without performing grading and predictive assessment on the current operation scenario, a wake-up reason and the like, and the main controller enters an operation mode of a normal frequency. Especially for a joint system composed of a plurality of controllers of different types, once a certain control system is woken up, all peripheral apparatuses will be woken up to enter an operation state without being distinguished regarding whether the peripheral apparatus needs to be woken up or needs to enter the operation state. Even though a certain peripheral apparatus is not operating, the peripheral apparatus is still woken up into its operation state. The electric quantity consumed by each time of wakeup is relatively small, but if the number of times of wakeup accumulates to a certain extent, the standby capability of the electronic device will be affected.

Therefore, there has not yet been an effective solution about how to reduce operation power consumption and standby power consumption of an electronic device.

SUMMARY

One problem to be solved by a first aspect of a hierarchical management method and system for a terminal device provided by embodiments of the disclosure is an overall standby capability of a conventional device being affected by the fact that, after a certain main controller in a terminal device is woken up, the other main controllers are also woken up while peripheral apparatuses are all woken up.

In order to solve the above problem, an embodiment of the disclosure provides a hierarchical management method for a terminal device. The terminal device includes at least one control system and at least one peripheral apparatus, which is connected to the control system. The method includes: when a terminal device receives a wake-up signal during dormancy, waking up a control system corresponding to the wake-up signal, and grading, by the control system in a wake-up state, an operation mode of the control system according to a data load; and according to the operation mode, waking up a peripheral apparatus that needs to perform data processing.

An embodiment of the disclosure further provide a hierarchical management system for a terminal device. The terminal device includes at least one control system and at least one peripheral apparatus, which is connected to the control system. The control system is configured to, when a wake-up signal is received, wake up a control system corresponding to the wake-up signal, and grade an operation mode of the control system according to a data load. The peripheral apparatus is configured to perform data processing according to the wake-up signal.

Other features and corresponding beneficial effects of the disclosure will be described and illustrated in the following description, and it should be understood that at least some of the beneficial effects will be apparent from the content disclosed in the description of the disclosure.

DETAILED DESCRIPTION

For clarify the objectives, solutions and advantages of the disclosure, embodiments of the disclosure are further illustrated in details below by combining the implementations with the accompanying drawings. It should be understood that the embodiments described herein are merely intended to explain the disclosure and are not intended to limit the disclosure.

Embodiment One

In order to solve the problem in the art of an overall standby capability of a device being affected by the fact that, after a certain main controller in a terminal device is woken up, the other main controllers are also woken up while peripheral apparatuses are all woken up, the embodiment provides a hierarchical management system for a terminal device. The system includes: at least one control system and at least one peripheral apparatus, which is connected to the control system. The control system is configured to, when a wake-up signal is received, wake up a control system corresponding to the wake-up signal, and grade an operation mode of the control system according to a data load. The peripheral apparatus is configured to perform data processing according to the wake-up signal.

Figure 1:
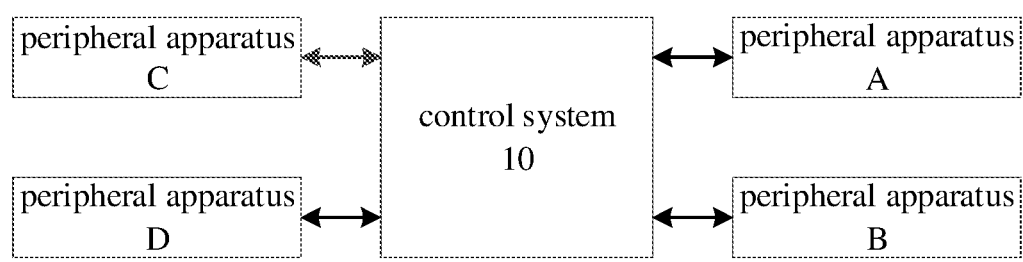
FIG. 1 is a structural diagram of a hierarchical management system for a terminal device in Embodiment One of the disclosure.

In an example of the embodiment, the terminal device is composed of one control system and a plurality of peripheral apparatuses. The control system is configured to implement a control function on the terminal device and a communication function with the peripheral apparatuses. In the example, illustration is provided regarding one control system and four connected peripheral apparatuses. Referring to FIG. 1, the terminal device includes one control system 10 and four peripheral apparatuses, which are connected to the control system 10. The four peripheral apparatuses are respectively a peripheral apparatus A, a peripheral apparatus B, a peripheral apparatus C and a peripheral apparatus D. In specific applications, these peripheral apparatuses are peripheral sensors of different bus types that have different functions, for example, an acceleration sensor having an I2C or SPI interface, a network card device of an HSIC bus category, and a standard serial device. The peripheral apparatus may also be a radio frequency transceiver, or may be a GPIO node that is externally provided at the control system, or a screen display apparatus based on the I2C or SPI interface. The terminal device in the example may specifically be a communication terminal device or a vehicle-mounted communication device, or may also be a terminal device that can transmit data through a wireless channel and can operate independently, which is not limited in the example. In the embodiment, the communication terminal device supports peripheral apparatus such as a USB, a serial port, an LED light and an acceleration sensor, and the communication device itself is a radio frequency device that has a data communication module, so as to implement a communication function with an external network base station. All the peripheral apparatuses can support independent dormancy and wake-up. When a system of the terminal device needs to enter a dormancy state, all the peripheral buses and means sequentially enter the dormancy state, and finally the device enters the dormancy state.

The peripheral apparatus that is connected to the control system is configured to allow independent power supply, dormancy and wake-up functions, that is, the control system can independently enable the peripheral apparatus A, can process data of the peripheral apparatus A, and can sense the interruption that occurs in the peripheral apparatus A and process an interruption event of the peripheral apparatus A. The control system can independently control a power-on enabling event, a dormancy event and a wake-up event of the peripheral apparatus A. For each of the peripheral apparatus B, the peripheral apparatus C and the peripheral apparatus D, the control system can also independently control a power-on enabling event, a dormancy event and a wake-up event thereof. The dormancy and wake-up of the peripheral apparatus A, the peripheral apparatus B, the peripheral apparatus C and the peripheral apparatus D are independent from each other, that is, when the terminal device is woken up from dormancy, the control system is woken up and then wakes up, according to a wake-up event and a data processing process, one or more of the peripheral apparatus that need to perform data processing, rather than the control system being woken up and then directly waking up all the peripheral apparatuses to enter their operation state. For example, when the terminal device is woken up, the control system is in a wake-up state, and according to a wake-up event, the control system needs to wake up the peripheral apparatus A to perform data processing. It can be found that, during the peripheral apparatus A performs data processing, the peripheral apparatus B is also required to perform data processing. Then, the control system subsequently wakes up the peripheral apparatus B to enter the operation state and perform data processing.

The control system 10 grades the operation mode of the control system according to a wake-up reason and a data load. In the embodiment, when the terminal device in dormancy is interrupted or woken up, the control system is woken up firstly, but the woken up control system does not directly enter its normal operation state. If the current wake-up is attributed to an abnormal demand, that is, the data load of the terminal device is less than a first preset threshold value and no data processing is required, so the peripheral apparatus does not need to perform data processing, then the control system enters an ultra-low-frequency operation mode, in which the control system is in the wake-up state, and c is in the dormancy state. In such an ultra-low-frequency mode, a CPU processor of the control system has an extremely low frequency, within five percent of that of a full-load state. In the ultra-low-frequency mode, the control system completes some low-power-consumption applications that record certain states in a memory. The control system needs to perform task processing when being woken up. If the data load is greater than the first preset threshold value, then the control system enters a medium-frequency mode, in which the control system is in the wake-up state, and at least one of the peripheral apparatuses is in the wake-up state, and at least one thereof is in the dormancy state. If the wake-up reason is that a certain peripheral apparatus is required to perform event processing, then the control system enters the medium-frequency mode and wakes up one or more of the peripheral apparatuses that need to perform data processing to enter the operation state, and one or more of the peripheral apparatuses that do not need to perform data processing remains dormancy. If the data load is greater than a second preset threshold value, then the control system enters a full-speed mode, in which the control system is in the wake-up state, and each of the peripheral apparatuses is in the wake-up state. In an example, when the data load reaches 90 percent of the current total load, the control system enters the full-speed mode, and all the peripheral apparatuses are woken up to perform data processing. In the embodiment, the control system 10 includes a control module and a monitoring module. The monitoring module is configured to monitor a wake-up signal and a data load of the system. The control module controls the control system 10 to enter a corresponding operation mode, and wakes up a peripheral apparatus that needs to perform data processing. If the wake-up reason is for an abnormal demand, the control system 10 enters the ultra-low-frequency mode. After a preset period elapses, the control module generates a dormancy instruction to control the control system 10 to enter the dormancy state again.

The embodiment provides the hierarchical management system for a terminal device. The terminal device includes a control system and at least one peripheral apparatus connected to the control system. When a wake-up signal is received, the control system wakes up a control system corresponding to the wake-up signal, and grades an operation mode of the control system according to a data load. By performing hierarchical management on a terminal device, where when the terminal device is woken up from dormancy, an operation mode of a control system of the terminal device is graded, and a peripheral apparatus that needs to perform data processing is woken up to enter an operation state, rather than all the peripheral apparatuses being woken up, the power consumption of the device can be reduced, and thus the standby time thereof can be prolonged.

Embodiment Two

In order to solve the problem in the art of an overall standby capability of a device being affected by the fact that, when a certain main controller in a terminal device is woken up, the other main controllers are also woken up while peripheral apparatuses are all woken up, the embodiment provides a hierarchical management system for a terminal device. The system includes at least one control system and at least one peripheral apparatus, which is connected to the control system. The control system is configured to, when a wake-up signal is received, wake up a control system corresponding to the wake-up signal, and grade an operation mode of the control system according to a data load. The peripheral apparatus is configured to perform data processing according to the wake-up signal.

Figure 2:
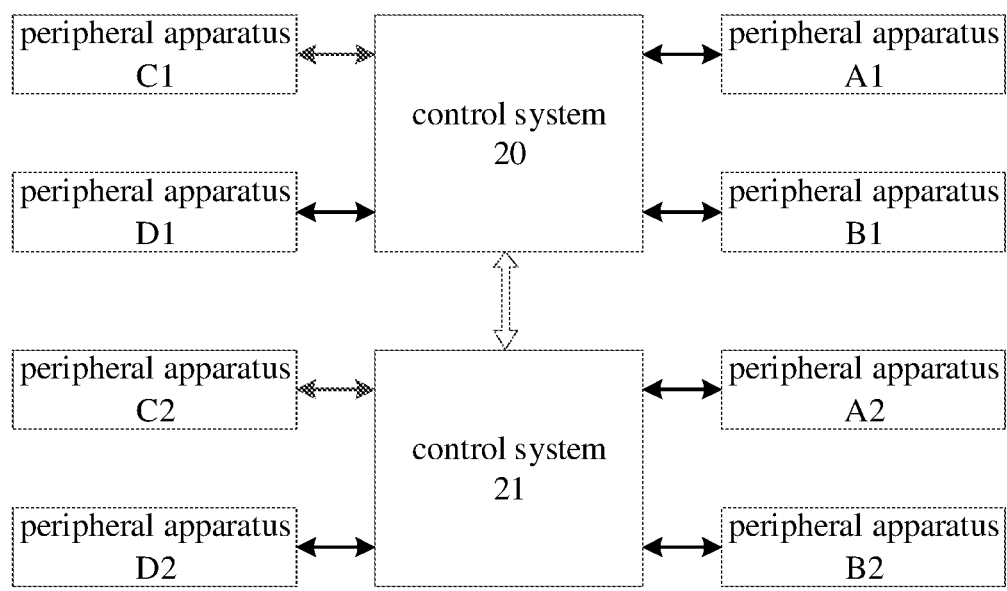
FIG. 2 is a structural diagram of a hierarchical management system for a terminal device in Embodiment Two of the disclosure.

In the embodiment, the terminal device is composed of two control systems and a plurality of peripheral apparatuses. Each of the control systems is configured to implement a control function on the terminal device and a communication function with the peripheral apparatuses. In the embodiment, illustration is provided regarding two control systems and four connected peripheral apparatuses. Referring to FIG. 2, the terminal device includes two control systems, namely, a control system 20 and a control system 21. A plurality of peripheral apparatuses, which are connected to the control system 20 are respectively a peripheral apparatus A1, a peripheral apparatus B1, a peripheral apparatus C1 and a peripheral apparatus D1. A plurality of peripheral apparatuses, which are connected to the control system 21, are respectively a peripheral apparatus A2, a peripheral apparatus B2, a peripheral apparatus C2 and a peripheral apparatus D2. In specific applications, these peripheral apparatuses are peripheral sensors of different bus types that have different functions, for example, an acceleration sensor having an I2C or SPI interface, a network card device of an HSIC bus category, and a standard serial device. The peripheral apparatus may also be a radio frequency transceiver, or may be a GPIO node that is externally provided at the control system, or a screen display apparatus based on the I2C or SPI interface. The peripheral apparatus that is connected to the control system is configured to allow independent power supply, dormancy and wake-up functions, that is, the control system 20 can independently enable the peripheral apparatus A1, can process data of the peripheral apparatus A1, and can sense the interruption that occurs in the peripheral apparatus A1 and process an interruption event of the peripheral apparatus A1. The control system can independently control a power-on enabling event, a dormancy event and a wake-up event of the peripheral apparatus A1. For each of the peripheral apparatus B1, the peripheral apparatus C1 and the peripheral apparatus D1, the control system 20 can also independently control a power-on enabling event, a dormancy event and a wake-up event thereof. The dormancy and wake-up of the peripheral apparatus A1, the peripheral apparatus B1, the peripheral apparatus C1 and the peripheral apparatus D1 are independent from each other, that is, when the terminal device is woken up from dormancy, the control system is woken up and then wakes up, according to a wake-up event and a data processing process, one or more of the peripheral apparatus that need to perform data processing, rather than the control system being woken up and then directly waking up all the peripheral apparatuses to enter their operation state. For example, when the terminal device is woken up, the control system 20 is in a wake-up state, and according to a wake-up event, the control system 20 needs to wake up the peripheral apparatus A1 to perform data processing. It can be found that, during the peripheral apparatus A1 performs data processing, the peripheral apparatus B1 is also required to perform data processing. Then, the control system subsequently wakes up the peripheral apparatus B1 to enter the operation state and perform data processing.

In the embodiment, the control system 20 and the control system 21 each have their own independent dormancy and wake-up functions, and each peripheral apparatus that is connected thereto also has its own independent dormancy and wake-up function, that is, when the current wake-up signal from the terminal device only needs to wake up the control system 20, the control system 21 and the peripheral apparatuses that are connected thereto are still in dormancy, and are not woken up along with the control system 20 being woken up. When the control system 21 is required to perform data processing during the control system 20 performs data processing after being woken up, the control system 20 can wake up the control system 21 so as to perform relevant data processing.

In the embodiment, the terminal device may specifically be a communication terminal device and a vehicle-mounted communication device, or may also be a terminal device that can transmit data through a wireless channel and can operate independently. In an example of the embodiment, the terminal device is a vehicle-mounted terminal device composed of one single chip microcomputer system and one communication terminal, that is, the control system 21 is a single chip microcomputer, the single chip microcomputer system is a slave computer system, and peripheral apparatuses connected thereto are a CAN bus and other sensor apparatuses. The communication terminal is a master computer system, that is, the control system 20 is the communication terminal, which implements a networking function, and completes a communication function of uploading and downloading vehicle-mounted data. The master computer and the slave computer may be connected by a serial port, SPI, I2C, etc. In the embodiment, the slave computer and the master computer are connected by the serial port, so as to realize data communication between the master computer and the slave computer. Moreover, the master computer and the slave computer are configured with a plurality of state display interfaces, which display respective current states, such as operation, dormancy, etc. When both the master computer system and the slave computer system are in their dormancy state, a CAN of the slave computer is connected to a CAN bus system of a vehicle. Another CAN bus device of the vehicle sends out a signal, which causes the CAN of the slave computer being woken up. The CAN bus of the slave computer will have a high-level task, with its operation mode switched from the ultra-low-frequency mode to the full-speed mode, so as to enter a full-speed running state. However, the master computer will not be woken up directly, a bus that is connected to the master computer being in the dormancy state. The slave computer further parses data that is received or transmitted through the CAN bus since the latter is woken up. Upon parsing of the data, whether the data is a broadcast message signal or another vehicle-mounted parameter signal and whether the data needs to be reported to a higher-level network are determined according to a network packet request. If the data is a broadcasting network packet is or a slave computer parameter packet is acquired, the slave computer automatically enters the dormancy state again after its parsing and processing are completed. If data that is transmitted by the CAN needs to be communicated with an external network service, an association bus between the master computer and the slave computer is woken up, so as to enable the master computer to be woken up. Since the communication bus is woken up, the master computer is in the wake-up state and enters the ultra-low-frequency mode, and determines that the communication bus has been woken up and that there is a network packet to be transmitted. Vehicle-mounted interaction data in the CAN belongs to a higher-level task, and thus the master computer will be immediately switched from the ultra-low-frequency mode to the full-speed mode. Finally, the vehicle-mounted terminal device enters the full-speed mode, waking up a radio frequency main module into a full-speed operation mode.

The embodiment provides the hierarchical management system for a terminal device. The terminal device includes a control system and at least one peripheral apparatus connected to the control system. When a wake-up signal is received, the control system wakes up a control system corresponding to the wake-up signal, and grades an operation mode of the control system according to a data load. By performing hierarchical management on a terminal device, where when the terminal device is woken up from dormancy, an operation mode of a control system of the terminal device is graded, and a peripheral apparatus that needs to perform data processing is woken up to enter an operation state, rather than all the peripheral apparatuses being woken up, the power consumption of the device can be reduced, and thus the standby time thereof can be prolonged.

Embodiment Three

Figure 3:
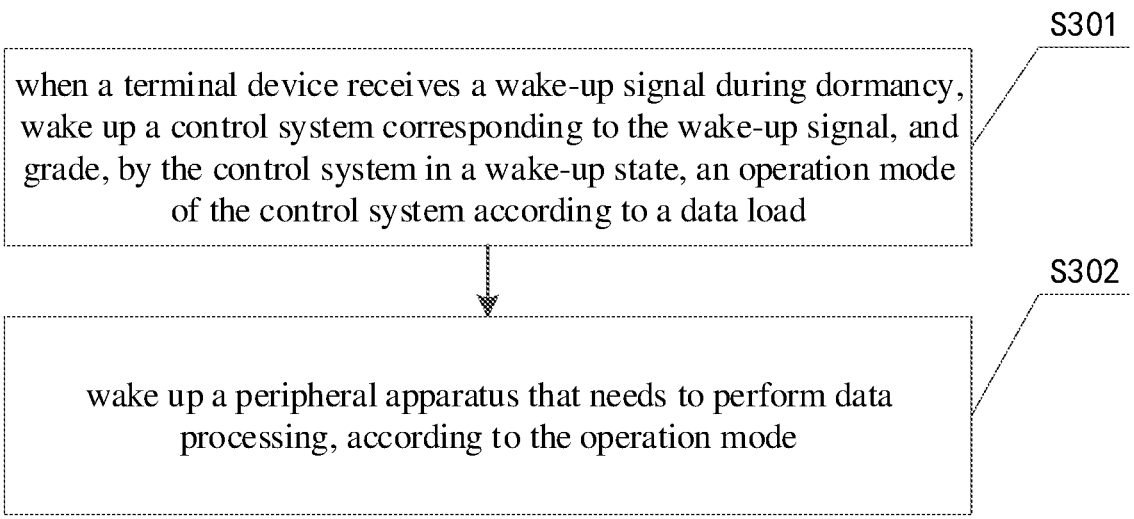
FIG. 3 is a flowchart of a hierarchical management method for a terminal device in Embodiment Three of the disclosure.

In order to solve the problem in the art of an overall standby capability of a device being affected by the fact that, when a certain main controller in a terminal device is woken up, the other main controllers are also woken up while peripheral apparatuses are all woken up, the embodiment provides a hierarchical management method for a terminal device. As shown in FIG. 3, the method includes the following steps.

At step S301, when a terminal device receives a wake-up signal during dormancy, a control system corresponding to the wake-up signal is woken up, and the control system in a wake-up state grades an operation mode of the control system according to a data load.

The terminal device includes at least one control system and at least one peripheral apparatus, which is connected to the control system. The control systems each have their own independent dormancy and wake-up functions, that is, when the terminal device is woken up from dormancy, the terminal device wakes up a corresponding control system according to the wake-up signal, rather than directly waking up all the control systems.

At step S302, a peripheral apparatus that needs to perform data processing is woken up according to the operation mode.

Each peripheral apparatus has its own independent dormancy and wake-up function, that is, when the control system is woken up, the control system wakes up, according to its current operation mode, a peripheral apparatus that needs to perform data processing, rather than directly waking up all the peripheral apparatuses that are connected to the control system from dormancy to enter the operation state, and a peripheral apparatus that does not need to perform data processing remains dormancy.

In step S301, the control system grading the operation mode of the control system according to a wake-up reason and the data load includes the following processes: when the wake-up reason is wake-up for an abnormal demand, the operation mode of the control system is controlled into an ultra-low-frequency mode, where the control system is in the wake-up state, and each peripheral apparatus is in the dormancy state; when the data load is less than a preset threshold value, the operation mode of the control system is controlled into a medium-frequency mode, where the control system is in the wake-up state, at least one peripheral apparatus is in the wake-up state, and at least one peripheral apparatus is in the dormancy state; and when the data load is greater than the preset threshold value, the operation mode of the control system is controlled into a full-speed mode, where the control system is in the wake-up state, and each peripheral apparatus is in the wake-up state.

In the embodiment, when the wake-up reason is for an abnormal demand, the control system enters the ultra-low-frequency mode. After a preset period elapses, the control system enters the dormancy state again according to an instruction. In the medium-frequency mode, the control system wakes up a peripheral apparatus in the dormancy state that is associated with a peripheral apparatus in the wake-up state according to a data processing process, that is, the control system currently wakes up one of the peripheral apparatuses that are connected to the control system to perform data processing. During the data processing process, when another peripheral apparatus is also required to perform data processing, the control system can wake up the peripheral apparatus that needs to perform data processing.

Figure 4:
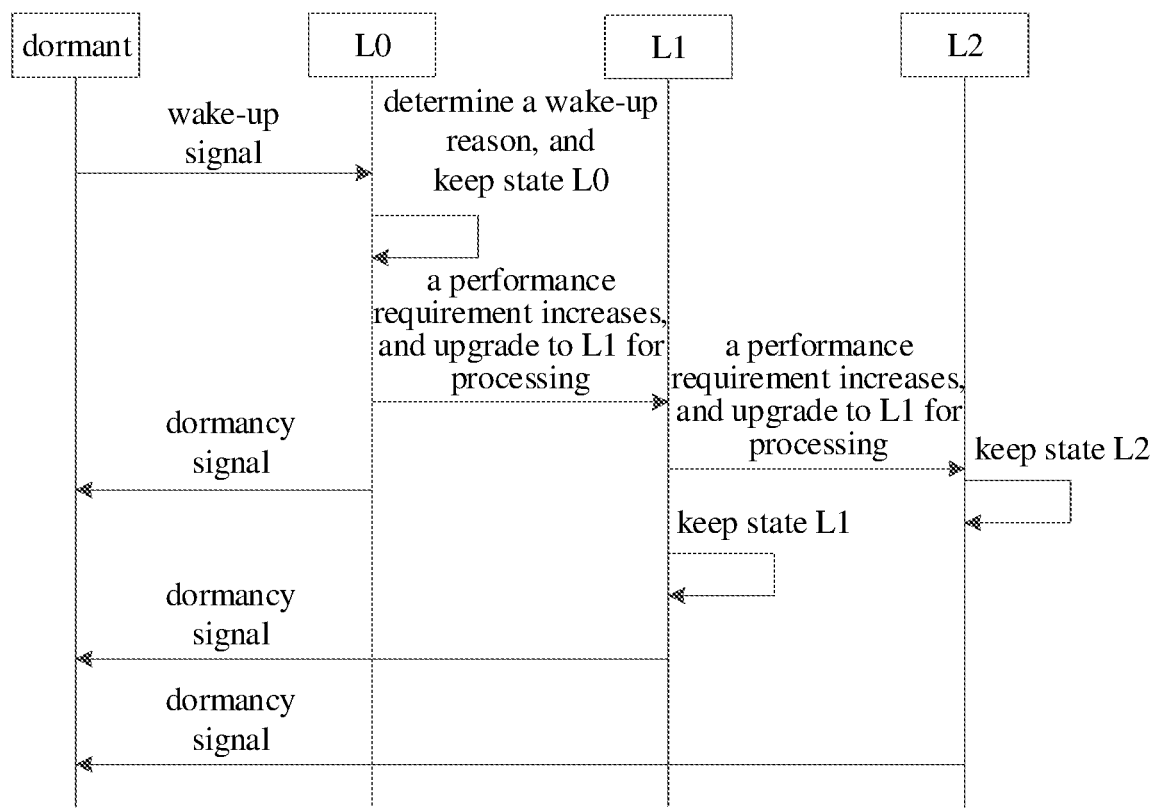
FIG. 4 is a flowchart of a dormancy/wake-up control process for a terminal device in Embodiment Three of the disclosure.

In the embodiment, the operation mode of the control system is graded according to the wake-up signal and the data load. FIG. 4 is a flowchart of a dormancy/wake-up control process for a terminal device provided by the embodiment. The operation mode of the control system will be graded as an ultra-low-frequency mode L0, a medium-frequency mode L1, or a full-speed mode L2. The ultra-low-frequency mode refers to that the control system is in the wake-up state, and each peripheral apparatus is in the dormancy state. In such an ultra-low-frequency mode, a CPU processor of the control system will have an extremely low frequency, within five percent of that of a full-load state. When the terminal device in dormancy receives a wake-up signal and determines that the current wake-up reason is for an abnormal demand or merely for an application at low power consumption that records certain states in a memory, the terminal device can run in the ultra-low-frequency mode L0, and enter the dormancy state again after running. At this time, if a certain peripheral apparatus is required to perform data processing, however, since the terminal device is in the ultra-low-frequency mode, data processing is incapable because a performance requirement of data processing cannot be met, then the control system is switched to the medium-frequency mode L1, and wakes up the peripheral apparatus that needs to perform data processing. In the medium-frequency mode, the current system task is in a medium scheduling state. According to a data processing process, merely a necessary peripheral apparatus is woken up, and any other peripheral apparatus remains dormancy. When a processed data load reaches 90 percent of the current total load, the control system is then switched to the full-speed mode L2, where all the peripherals are in the wake-up state, as required, to perform data processing.

In an application scenario, a communication terminal device is in the dormancy state. Since a network signal changes, an external radio frequency interruption signal is generated, a control system is woken up, and the terminal device enters the mode L0. In the mode L0, the reason for current network changes is further determined. At this time, it is unnecessary to wake up other peripheral apparatuses and unnecessary to upgrade to L1 for processing. After determination is completed, the wireless terminal device enters the dormancy state again, thereby greatly reducing the power consumption of the device.

In the hierarchical management method for a terminal device provided by the embodiment, when a terminal device receives a wake-up signal during dormancy, a control system corresponding to the wake-up signal may be woken up, and the control system in a wake-up state may grade an operation mode of the control system according to a data load; and according to the operation mode, a peripheral apparatus that needs to perform data processing may be woken up. By performing hierarchical management on an operation mode of a terminal device, where when the terminal device is woken up from dormancy, an operation mode of a control system of the terminal device is graded, and merely a peripheral apparatus that needs to perform data processing is woken up to enter an operation state, rather than all the peripheral apparatuses being woken up, the power consumption of the device can be reduced, and thus the standby time thereof can be prolonged.

Hence, it should be understood by those of skills in the art that all or some of the steps in the method disclosed above, a system, and a function module/unit in an apparatus can be embodied as software (which can be realized by a computer program code that can be executed by a computer apparatus), firmware, hardware and a suitable combination thereof. In the hardware implementation, the division of the function modules/units mentioned in the above description does not necessarily correspond to the division of physical assemblies. For example, one physical assembly can have a plurality of functions, or one function or step can be executed by several physical assemblies in cooperation. Some or all of the assemblies can be embodied as software that is executed by a processor, such as a central processing unit, a digital signal processor or a microprocessor, or be embodied as hardware, or be embodied as an integrated circuit, such as an application specific integrated circuit.

In addition, it is well known to those of ordinary skill in the art that a communication medium generally contains computer-readable instructions, data structures, computer program modules or other data in a modulated data signal such as a carrier or other transmission mechanisms, and can include any information transfer medium. Therefore, the application is not limited to any specific combination of hardware and software.

The above description should be considered as detailed illustrations for the disclosed embodiments in conjunction with specific implementations, and it should not be interpreted that the specific implementations as disclosed are only limited to those illustrations. For those of ordinary skills in the art to which the application belongs, without departing from the concept of the application, several simple deductions or replacements can be made, which should all be regarded as falling within the scope of the application.

What is claimed is:
1. A hierarchical management method for a terminal device, the terminal device comprising at least one control system, and at least one peripheral apparatus, which is connected to the control system, and the method comprising:
   waking up, when a terminal device receives a wake-up signal during dormancy, a control system corresponding to the wake-up signal, and grading, by the control system in a wake-up state, an operation mode of the control system according to a data load; and
   waking up, according to the operation mode, a peripheral apparatus that needs to perform data processing;
   wherein the grading the operation mode of the control system according to the data load by the control system comprises:
   when the data load is less than a first preset threshold value, controlling the operation mode of the control system into an ultra-low-frequency mode, in which the control system is in the wake-up state, and each peripheral apparatus is in a dormancy state;
   when the data load is greater than the first preset threshold value, controlling the operation mode of the control system into a medium-frequency mode, in which the control system is in the wake-up state, at least one peripheral apparatus is in the wake-up state, and at least one peripheral apparatus is in the dormancy state; or
   when the data load is greater than a second preset threshold value, controlling the operation mode of the control system into a full-speed mode, in which the control system is in the wake-up state, and each peripheral apparatus is in the wake-up state.

2. The hierarchical management method for a terminal device of claim 1, wherein when the data load is less than the first preset threshold value, the control system enters the ultra-low-frequency mode, and after a preset period elapses, the control system enters the dormancy state again according to an instruction.

3. The hierarchical management method for a terminal device of claim 1, wherein when in the medium-frequency mode, the control system wakes up a peripheral apparatus in the dormancy state that is associated with a peripheral apparatus in the wake-up state according to a data processing process.

4. The hierarchical management method for a terminal device of claim 1, wherein when the terminal device comprises more than two control systems, the control system in the wake-up state wakes up a control system in dormancy according to a data load.

5. A hierarchical management system for a terminal device, the system comprising:
   at least one control system; and
   at least one peripheral apparatus, which is connected to the control system,
   wherein the control system is configured to implement a control function of the terminal device, and when a wake-up signal is received, wake up a control system corresponding to the wake-up signal, and grade an operation mode of the control system according to a data load; and the peripheral apparatus is configured to perform data processing according to the wake-up signal;
   wherein the control system comprises a control module and a monitoring module,
   wherein the monitoring module is configured to monitor a wake-up signal and a data load of the system; and
   wherein the control module is configured to:
   when the data load is less than a first preset threshold value, control the operation mode of the control system into an ultra-low-frequency mode, in which the control system is in the wake-up state, and each peripheral apparatus is in a dormancy state;
   when the data load is greater than the first preset threshold value, control the operation mode of the control system into a medium-frequency mode, in which the control system is in the wake-up state, at least one peripheral apparatus is in the wake-up state, and at least one peripheral apparatus is in the dormancy state; or when the data load is greater than a second preset threshold value, control the operation mode of the control system into a full-speed mode, in which the control system is in the wake-up state, and each peripheral apparatus is in the wake-up state.

6. The hierarchical management system for a terminal device of claim 5, wherein the control module is configured to, when the data load is less than the first preset threshold value, control the control system to enter the ultra-low-frequency mode, and after a preset period elapses, generate a dormancy instruction to control the control system to enter the dormancy state again.

7. The hierarchical management system for a terminal device of claim 5, wherein the control module is configured to, when the control system is in the medium-frequency mode, wake up a peripheral apparatus in the dormancy state that is associated with a peripheral apparatus in the wake-up state according to a data processing process.

8. The hierarchical management system for a terminal device of claim 5, wherein when the terminal device comprises more than two control systems, the control system in the wake-up state wakes up a control system in dormancy according to the data load.

\* \* \* \* \*